United States Patent
Sutardja et al.

(10) Patent No.: US 8,027,117 B1
(45) Date of Patent: Sep. 27, 2011

(54) ZONE SERVO WRITING USING SELF SERVO WRITING

(75) Inventors: Pantas Sutardja, Los Gatos, CA (US); Sukpaket Katchmart, Campbell, CA (US); Henri Sutioso, Saratoga, CA (US); David Liaw, Newark, CA (US)

(73) Assignee: Marvell International Ltd., Hamilton (BM)

(*) Notice: Subject to any disclaimer, the term of this patent is extended or adjusted under 35 U.S.C. 154(b) by 185 days.

(21) Appl. No.: 12/546,164

(22) Filed: Aug. 24, 2009

Related U.S. Application Data

(60) Provisional application No. 61/091,622, filed on Aug. 25, 2008.

(51) Int. Cl.
 *G11B 21/02* (2006.01)
 *G11B 5/09* (2006.01)
 *G11B 5/596* (2006.01)
(52) U.S. Cl. ............... 360/75; 360/51; 360/77.08
(58) Field of Classification Search .............. None
 See application file for complete search history.

(56) References Cited

U.S. PATENT DOCUMENTS

| | | | |
|---|---|---|---|
| 4,894,734 A | 1/1990 | Fischler et al. | |
| 5,193,034 A | 3/1993 | Tsuyoshi et al. | |
| 5,668,679 A | 9/1997 | Swearingen et al. | |
| 6,084,738 A | 7/2000 | Duffy | |
| 6,965,489 B1 | 11/2005 | Lee et al. | |
| 7,307,807 B1 | 12/2007 | Han et al. | |
| 7,391,584 B1 * | 6/2008 | Sheh et al. ............ | 360/51 |
| 7,639,446 B2 * | 12/2009 | Mizukoshi et al. ...... | 360/75 |

* cited by examiner

*Primary Examiner* — Andrew L Sniezek

(57) ABSTRACT

A hard disk controller (HDC) of a hard disk drive (HDD) includes a read module, a clock generator module, and a write module. The read module reads servo spirals from a magnetic medium of the HDD via a read head of the HDD and generates read signals. The clock generator module generates a spiral clock having a first frequency based on the read signals and generates based on the spiral clock R write clocks having R frequencies, respectively, that are different than the first frequency, where R is an integer greater than 1. The write module writes via a write head of the HDD a first servo wedge on a first one of R zones of the magnetic medium using a first one of the R write clocks and a second servo wedge on a second one of the R zones using a second one of the R write clocks.

15 Claims, 14 Drawing Sheets

ZONE SERVO WRITING USING SELF SERVO WRITING

CROSS-REFERENCE TO RELATED APPLICATIONS

This application claims the benefit of U.S. Provisional Application No. 61/091,622, filed on Aug. 25, 2008. The disclosure of the above application is incorporated herein by reference in its entirety.

FIELD

The present disclosure relates to hard disk drives (HDDs), and more particularly to writing zone servo on HDDs using self-servo-writing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (R/W) channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16. In some implementations, the HDD PCB 14 includes a self-servo write (SSW) module 42 that writes servo on the platters 16 using the heads 20 prior to storing data on the HDD 10. Initially, during manufacturing, an external apparatus may be used to write servo spirals on the platters 16. Subsequently, the SSW module 42 writes servo wedges that extend radially from an inner diameter (ID) of the platters 16 to an outer diameter (OD) of the platters 16 based on the servo spirals. The servo wedges are equally spaced from each other like spokes of a wheel and are interleaved with user data that is written between adjacent servo wedges.

SUMMARY

A hard disk controller (HDC) of a hard disk drive (HDD) comprises a read module, a clock generator module, and a write module. The read module reads servo spirals from a magnetic medium of the HDD via a read head of the HDD and generates read signals. The clock generator module generates a spiral clock having a first frequency based on the read signals. The clock generator module generates based on the spiral clock R write clocks having R frequencies, respectively, that are different than the first frequency, where R is an integer greater than 1. The write module writes a first servo wedge via a write head of the HDD on a first one of R zones of the magnetic medium using a first one of the R write clocks. The write module writes a second servo wedge via the write head on a second one of the R zones using a second one of the R write clocks.

In another feature, the HDC further comprises a phase measuring module that measures a phase difference between the spiral clock and one of the R write clocks based on a reference clock having a third frequency that is greater than a corresponding frequency of the one of the R write clocks.

In another feature, the HDC further comprises a counting module that counts pulses of the reference clock from a reference time and that generates first and second counts when a first predetermined number of pulses of the spiral clock and a second predetermined number of pulses of the one of the R write clocks are counted from the reference time, respectively. The phase measuring module measures the phase difference based on the third frequency and a difference between the first and second counts.

In still other features, a hard disk controller (HDC) of a hard disk drive (HDD) comprises a read module a clock generator module, and a phase measuring module. The read module reads servo spirals from a magnetic medium of the HDD via a read head of the HDD and generates read signals. The clock generator module generates a spiral clock having a first frequency based on the read signals and generates based on the spiral clock a write clock having a second frequency that is different than the first frequency. The phase measuring module measures a phase difference between the spiral clock and the write clock based on a reference clock having a third frequency that is greater than the second frequency.

In another feature, the HDC further comprises a write module that writes a first servo wedge via a write head of the HDD on a first zone of the magnetic medium using the write clock when the phase difference is corrected. The first zone is proximate to an inner diameter (ID) of the magnetic medium.

In another feature, the HDC further comprises a counting module that counts pulses of the reference clock from a reference time and that generates first and second counts when a first predetermined number of pulses of the spiral clock and a second predetermined number of pulses of the write clock are counted from the reference time, respectively. The phase measuring module measures the phase difference based on the third frequency and a difference between the first and second counts.

In another feature, the HDC further comprises a control module that adjusts a first phase of the write clock based on the phase difference and that synchronizes the first phase to a second phase of the spiral clock.

In another feature, the clock generator module comprises a dividing module and a phase locked loop (PLL). The dividing module divides the first frequency by D and that generates a divided signal having a fourth frequency, where D is an integer greater than 1. The PLL generates the write clock based on the divided signal by multiplying the fourth frequency by M, where M is an integer greater than 1.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
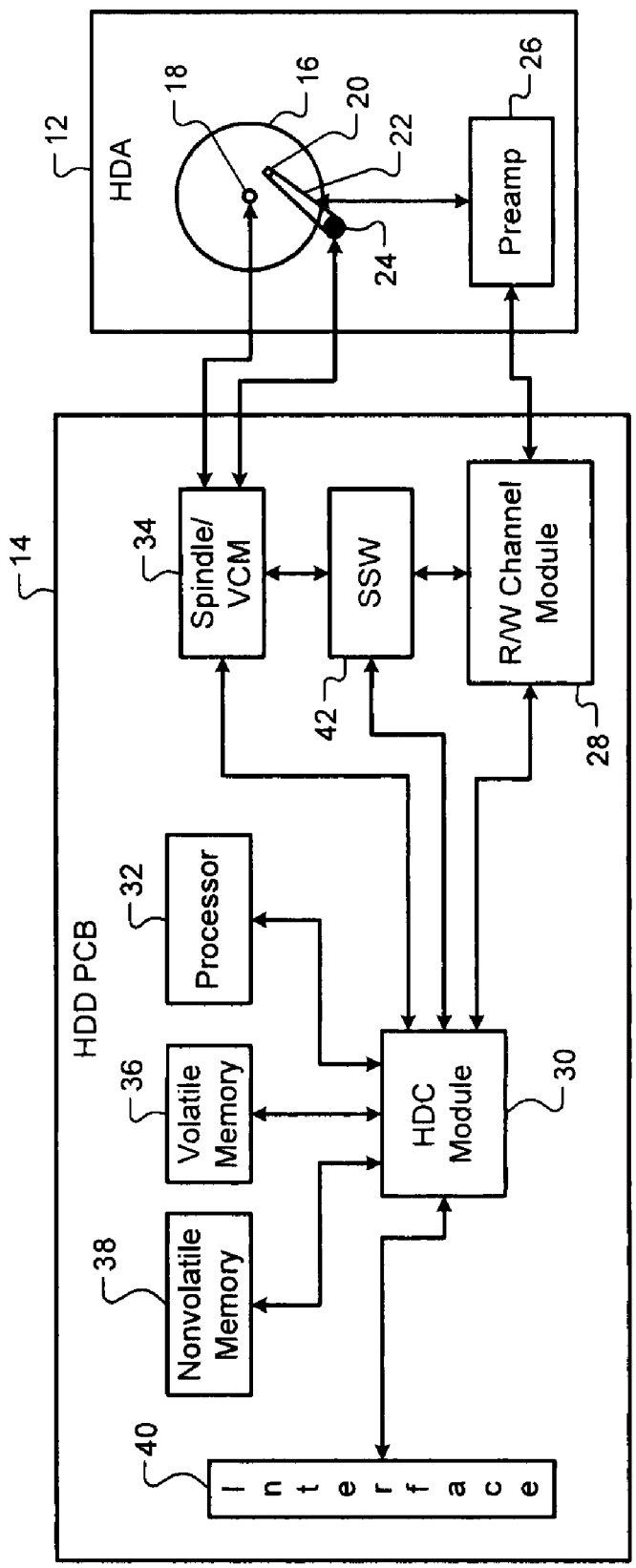
FIG. 1 is a functional block diagram of a hard disk drive (HDD) according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure relates to writing servo on hard disk drives (HDDs) in zones using self-servo-writing (SSW). Typically, servo wedges extend radially from an inner diameter (ID) to an outer diameter (OD) of HDD platters. When servo is written in zones, however, the servo wedges are divided into concentric zones. Each zone comprises portions of a plurality of tracks. According to the teachings of the present disclosure, servo is written in the zones using a SSW system instead of using a specialized apparatus that is external to the HDDs. Specifically, servo is written in the zones based on servo spirals that are prewritten on the platters using the SSW system.

A write clock used to write the servo is synchronized to disk rotation and phase-locked to a spiral clock to facilitate concentric servo stitch writing. Frequency of the write clock is unchanged when writing servo in a single zone. The frequency, however, is increased when servo is written in zones with increasing radii. Thus, the frequency in an outer zone (i.e., a zone closer to OD) is greater than in an inner zone (i.e., a zone closer to ID). Novel systems and methods for generating, synchronizing, and phase-locking the write clock and for writing servo in the zones using SSW are disclosed.

The disclosure is organized as follows. An overview of spiral-based servo writing and zone servo writing is first presented. A detailed description of the novel systems and methods follows. Thereafter, exemplary implementations of the novel systems and methods are described in detail.

Spiral-based self-servo-writing is a process of writing concentric servo wedges based on position and timing information derived from a prewritten spiral pattern. Typically, the spiral-based self-servo-writing process includes the following steps: (1) locking phase and frequency of an internal system clock to a spiral pattern, thereby synchronizing a timer/counter called a spiral counter to an angular position of the disk; (2) measuring a radial position of the read/write head on the disk based on position information derived from spiral pattern; and (3) writing a servo track based on current radial and angular position to the disk.

The spiral-based self-servo-writing process normally utilizes the spiral counter ($C_s$), which is a modulo counter, to establish the position of the read/write head on the disk. The spiral counter $C_s$ counts clock cycles of a spiral servo clock (SCLK) generated by reading diamond-shaped spiral wedges pre-written on the disk. The number of SCLK clock cycles per revolution is normally an integer. A value of the spiral counter $C_s$ (i.e. count $C_s$) is directly related to the angular position of the read/write head on the disk. The spiral counter $C_s$ is synchronized to revolutions of the disk. The spiral counter $C_s$ resets at each revolution of the disk. Thus, the count indicates the angular position on the disk along any diameter from ID to OD during a given revolution.

Since servo wedges are written with equal spacing, a maximum value for the spiral counter $C_s$ may be expressed by the following equation:

$$Max(C_s) = (n*M)$$

where n is number of servo wedges (spokes) written per revolution, and M is number of SCLK cycles between starting points of two adjacent servo wedge.

Figure 2:
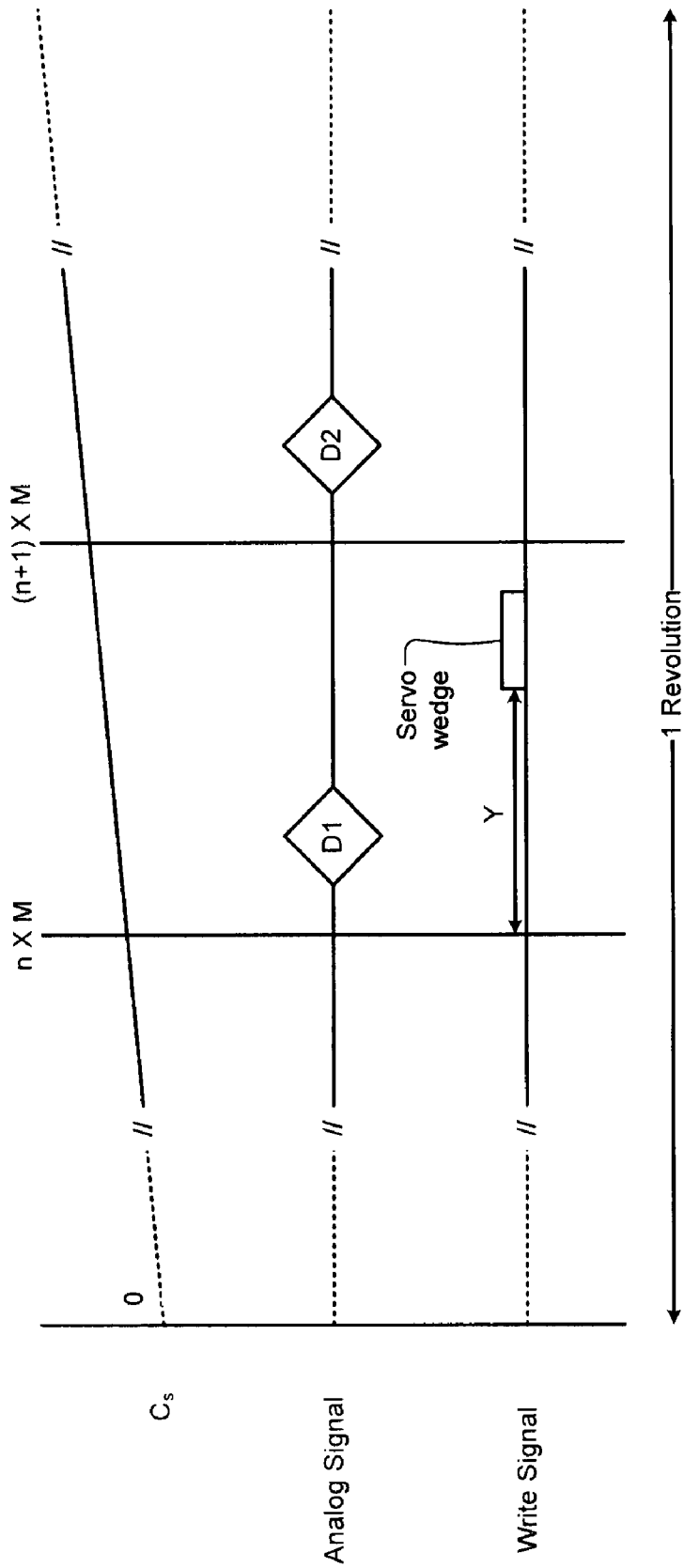
FIG. 2 is a schematic of writing of a concentric servo wedge using spiral-based self-servo-write.

Referring now to FIG. 2, a schematic of writing of a concentric servo wedge n using spiral-based self-servo-write is shown. Position of spiral diamonds D1 and D2 indicate radial positions of the read/write head. A distance between D1 and D2 indicates a disk rotational frequency offset. A servo writing circuit/firmware of the HDD tracks this information. The frequency offset is added to SCLK to synchronize SCLK frequency to the disk rotation. Thus, SCLK and spiral counter $C_s$ are phase locked and frequency locked to the disk rotation.

When optimum locking is obtained and the read/write head is at a desired radial position, the servo circuit generates a write signal to write a servo wedge starting at a position given by the following equation:

$$P(n) = (n*M) + Y$$

where n=number of a servo wedge being written; n=0, 1, 2, 3, ..., and (N−1); and Y is a constant offset for writing the servo wedge, where Y<M.

Thus, when the spiral counter $C_s$ reaches a count corresponding to an $n^{th}$ servo wedge (i.e., when $C_s=n*M$), the servo writing circuit waits Y clock cycles of SCLK and then writes the $n^{th}$ servo wedge. In other words, writing the $n^{th}$ servo wedge begins when $C_s=n*M+Y$.

The write signal writes concentric servo wedges on the disk using the SCLK that is synchronized to the disk. In other words, phase and frequency of a write clock (WCLK) are the same as phase and frequency of the spiral clock SCLK. Thus, spiral-based servo can maintain proper stitch between any two adjacent servo tracks. The spiral pattern is continuously written from ID to OD using the write clock having a constant frequency.

Typically, a locking circuit of the HDD synchronizes an internal clock to the prewritten spiral pattern. The internal clock, which has the same frequency as the SCLK, is then used to write servo wedges synchronous to the angular position of the disk. Thus, a concentric servo tracking frequency is the same throughout a radial position.

This method of servo writing cannot write a zone servo pattern, which uses a different non-harmonic write frequency at different radial positions (i.e., zones). Instead, the method writes concentric servo wedges using the same write clock frequency throughout a radial position on the disk. The writing frequency is limited by a maximum allowable bit density at the ID. This limitation forces writing servo track at the OD at a lower bit density than the bit density at the ID. Typically, the bit density at the OD is approximately one-half of the bit density at the ID. Accordingly, this scheme uses disk space inefficiently.

The disk space can be used efficiently when servo tracks are divided into a number of different zones based on their radial positions. Servo sectors in the same zone are written at the same frequency called a zone frequency. The zone frequency is increased for each zone from the ID to the OD to maintain constant servo bit density in all the zones.

Figure 3A:
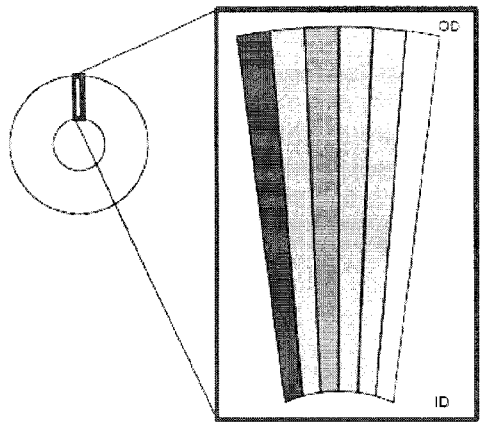
FIG. 3A shows servo wedges of non-zone concentric servo in physical domain.
Figure 3B:
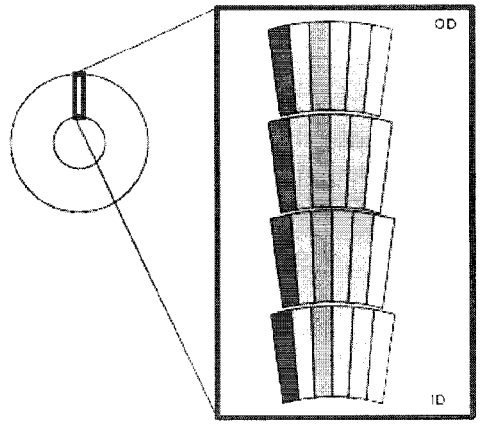
FIG. 3B shows servo wedges of zone concentric servo in physical domain.
Figure 4A:
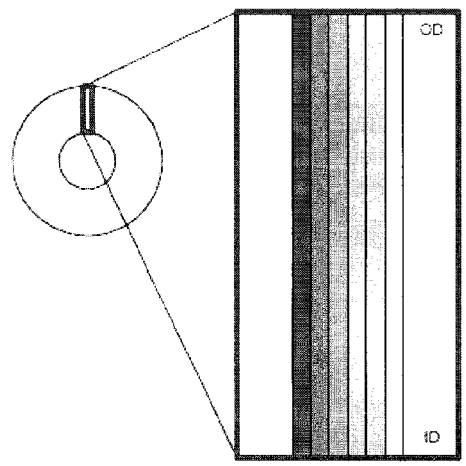
FIG. 4A shows servo wedges of non-zone concentric servo in time domain.
Figure 4B:
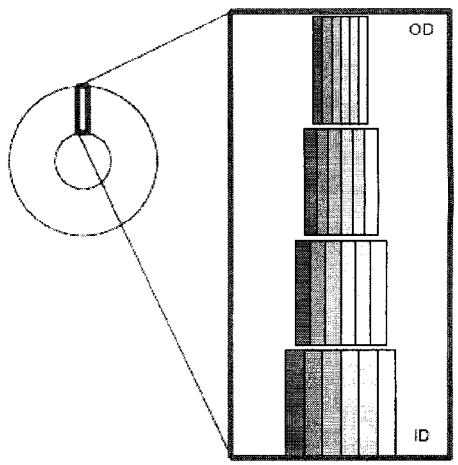
FIG. 4B shows servo wedges of zone concentric servo in time domain.

Referring now to FIGS. 3A-4B, non-zone concentric servo and zone concentric servo are shown. FIGS. 3A and 3B show non-zone concentric servo in time domain and frequency domain, respectively. FIGS. 4A and 4B show zone concentric servo in time domain and physical domain, respectively.

Each strip represents a servo wedge. Since multiple non-harmonic write frequencies are used to write zone servo, zone servo pattern cannot be easily written using spiral-based self-servo writing technique mentioned above. Accordingly, the zone servo is presently written using only an external expensive servo track writing apparatus comprising special hardware.

The present disclosure relates to writing zone servo using self-servo-write (ZS-SSW). ZS-SSW utilizes a frequency locking technique used in spiral-based servo writing to determine radial and angular positions on the disk. These positions in turn are used to determine writing patterns and writing frequencies in zones.

The write clock WCLK has a different frequency than the frequency of the spiral clock SCLK. The clock frequency of WCLK is determined by the radial position of the write head. The SCLK is used for tracking based on spirals, and the WCLK is used for writing zone servo. The WCLK has a frequency offset tracked to the SCLK. Thus, WCLK frequency is indirectly locked to disk rotation.

A ZS-SSW method according to the teachings of the present disclosure provides a novel process for sensing a phase difference between WCLK and SCLK at a designated position. Subsequently, the ZS-SSW method corrects the phase difference before writing final servo wedges at the designated position.

To accurately control phase coherence between SCLK and WCLK, a ratio of frequencies of SCLK and WCLK ($F_s/F_w$) may be constrained. For example, $N_s$ SCLK clock cycles and $N_w$ WCLK clock cycles occur between first written bits of two consecutive servo wedges, where $N_s$ and $N_w$ are integers. The ratio ($F_s/F_w$) may be expressed by the following equation:

$$\frac{F_s}{F_w} = \frac{N_s}{N_w}$$

where $F_s$ and $F_w$ denote frequencies of SCLK and WCLK, respectively.

Figure 5A:
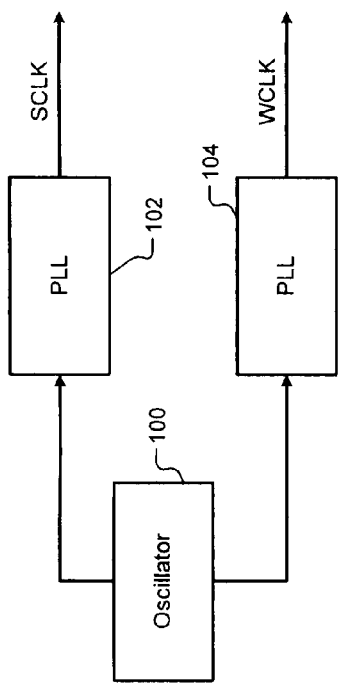
FIG. 5A is a functional block diagram of a clock generator that generates a spiral clock (SCLK) and a write clock (WCLK) independently of each other.
Figure 5B:
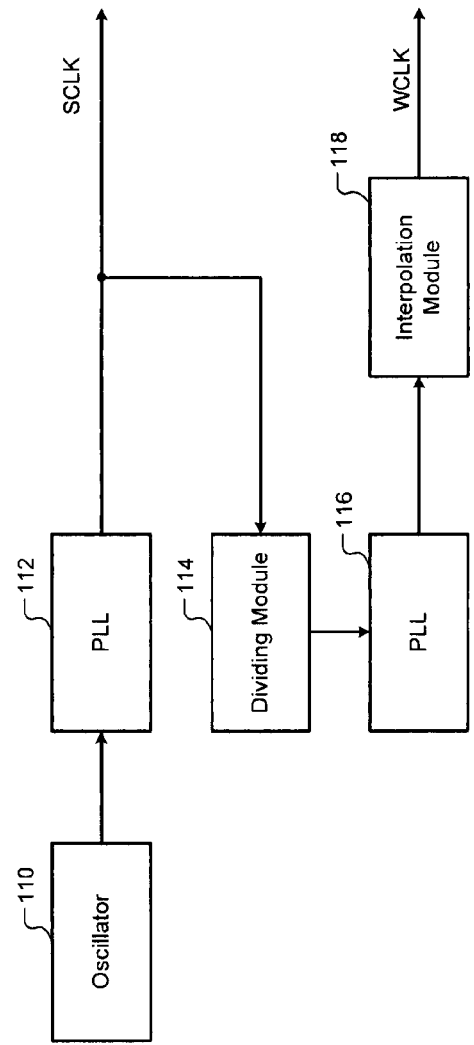
FIG. 5B is a functional block diagram of a clock generator that generates WCLK based on SCLK.

Referring now to FIGS. 5A and 5B, the clocks SCLK and WCLK may be generated in many ways. For example, the clocks SCLK and WCLK may be generated independently of each other as shown in FIG. 5A. Alternatively, WCLK may be generated based on SCLK as shown in FIG. 5B.

In FIG. 5A, the clocks SCLK and WCLK may be generated using an oscillator 100 and two phase-locked loops (PLLs) 102, 104, respectively. The frequency of each PLL 102, 104, however, may vary based on operating conditions. Thus, the two PLLs 102, 104 may not have substantially identical frequency offsets. Accordingly, an error in frequencies of SCLK and WCLK is a sum of an error in SCLK frequency $F_s$ and an error in WCLK frequency $F_w$ due to variations in the PLLs 102, 104. Additionally, the frequency $F_s$ of SCLK may have to be periodically adjusted to maintain synchronization between the disk rotation and internal spiral clock.

Alternatively, the clocks SCLK and WCLK may be generated according to the teachings of the present disclosure as shown in FIG. 5B. Specifically, WCLK may be generated based on SCLK. When the clocks SCLK and WCLK are generated as shown, frequency variations and errors in $F_s$ and $F_w$ can be minimized. Additionally, frequency offset synchronization between SCLK and WCLK can be maintained by generating WCLK from SCLK as shown.

In FIG. 5B, for example, SCLK is generated using an oscillator 110 and a PLL 112. WCLK is generated based on SCLK as follows. SCLK is divided down by a factor of "d" to generate a divided clock using a dividing module 114. A PLL 116 is used to multiply the divided clock up by "m" times. An interpolation module 118 is used to correct the phase of WCLK based on the phase difference between WCLK and SCLK as explained with reference to FIGS. 10-13.

The clock frequencies $F_s$ and $F_w$ may be selected such that the divisor d and the multiplier m are small integer numbers. Alternatively, "d" may be selected as an integer, and m can be represented by a binary number with a limited number of digits to the right of the decimal point.

Generating WCLK from SCLK instead of generating WCLK and SCLK independently of each other provides many benefits. For example, a possible frequency error is limited to the frequency error of the only PLL that generates WCLK from SCLK (e.g., PLL 116). Frequency offset can be controlled from a single point of control. Frequency offset locking is easy due to a single point of measurement and control for locking the frequency offset. Periodic updating of the frequency offset synchronization between two PLLs is obviated.

Figure 6:
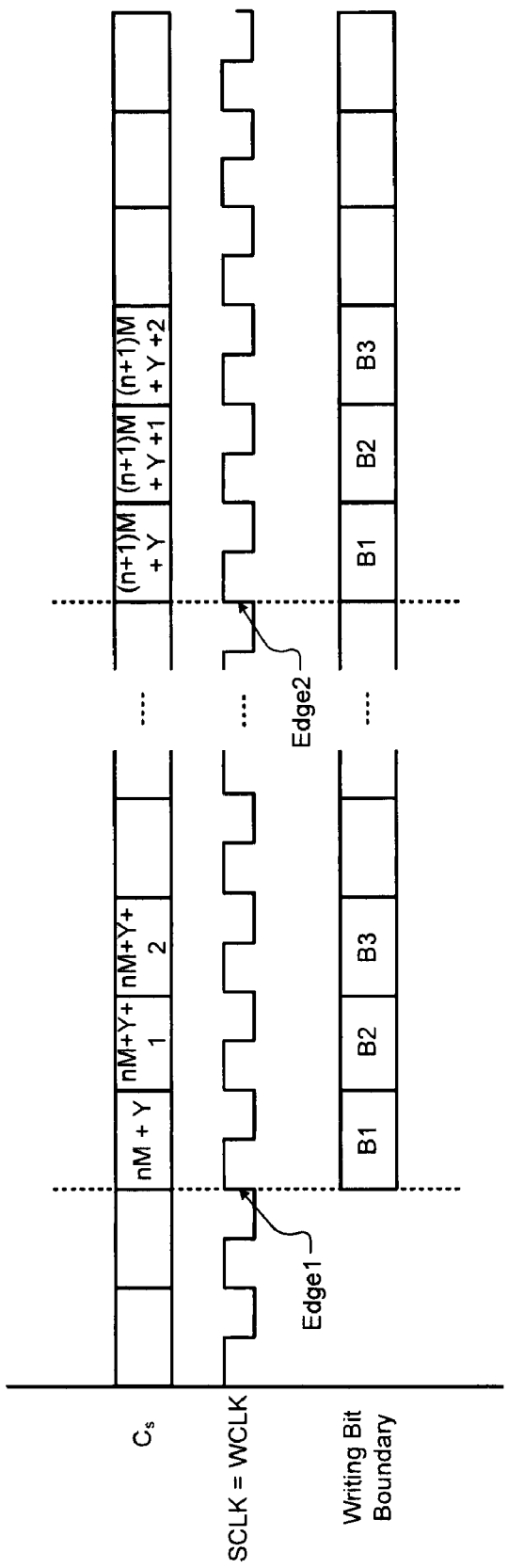
FIG. 6 is a timing diagram showing concentric servo wedges written using SCLK.

Referring now to FIG. 6, concentric non-zone servo wedges are typically written using SCLK, which has a single frequency, and which is frequency locked and phase locked to disk rotation. Since SCLK is typically used to write servo (i.e., since WCLK=SCLK), WCLK used to write servo is phase aligned to an ideal writing bit boundary (shown by dotted line).

For example, a first bit B1 of an $n^{th}$ servo wedge is written when $C_s=(n*M+Y)$, and a first bit B1 of an $(n+1)^{th}$ servo wedge is written when $C_s=((n+1)*M)+Y$ as shown. Edges 1 and 2 of SCLK, which is also WCLK, are phase aligned with the writing bit boundaries shown by dotted lines when the $C_s=((n*M)+Y)$ and $(((n+1)*M)+Y)$, respectively.

Figure 7:
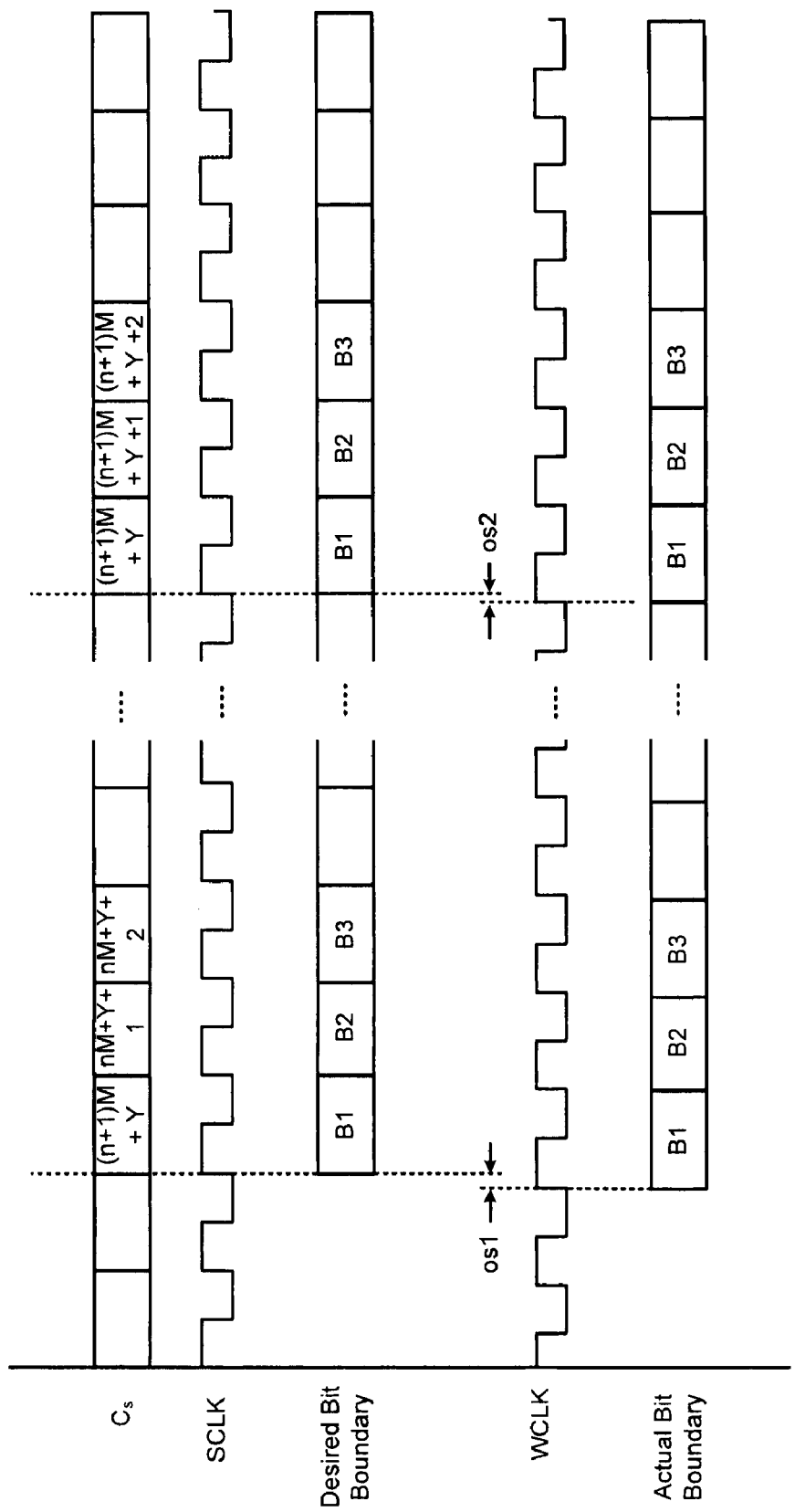
FIG. 7 is a timing diagram showing concentric servo wedges written using WCLK.

Referring now to FIG. 7, generating WCLK from SCLK may ensure that there are exactly $N_s$ clock cycles of SCLK and $N_w$ clock cycles of WCLK between first bits of two adjacent concentric servo wedges. However, the phases of SCLK and WCLK may not be aligned at a writing bit boundary. The alignment of clock edges of WCLK to the disk rotation angle is crucial to track stitching.

Ideally, with a fixed frequency ratio $(F_s/F_w)$ phase offset residues (e.g., os1 and os2, which are distances between edges of WCLK and write boundaries at two write points) should be equal. Practically, however, the ratio $(F_s/F_w)$ may vary. Consequently, the phase offsets, however small in values, may change over time.

The present disclosure provides a novel method for aligning WCLK to ideal writing bit boundaries by measuring and correcting the phase offset between WCLK and the ideal writing bit boundary. The writing bit boundary, being a hypothetical boundary, cannot be referenced for directly measuring the phase difference. Accordingly, an indirect method disclosed herein may be used to measure the phase offset.

For example, a position of (n*M+X) may be a starting point for writing a servo wedge n, where X is a synchronization offset. The starting point may be used as a synchronization point. The spiral counter $C_s$ may count every SCLK cycle. Thus, $M=N_s$ and Y=X. The synchronization point is a point that may be assigned as a writing bit boundary that is to be aligned to an edge of SCLK (e.g., a rising edge). This way, the phase difference between WCLK and the writing bit boundary can be measured by measuring the phase offset between WCLK and SCLK when the count $C_s=(n*M+X)$.

The clock edge of SCLK that is coincident (i.e., aligned) with the writing bit boundary can be easily determined using $C_s$ count. The clock edge of WCLK that is coincident (i.e., aligned) with the writing bit boundary, however, may not be easy to determine. To determine the correct clock edge of WCLK that is coincident (i.e., aligned) with the writing bit boundary, an identification may be assigned to each WCLK clock cycle.

For example, a write counter $C_w$ may be initiated, where a count $C_w$ is given by the following equation:

$$\text{Max}(C_w)=N*M_w$$

where N is a number of servo wedges, $M_w$ is a number of clock cycles between starting points of adjacent servo wedges and is normally equal to $M*(N_w/N_s)$.

The spiral counter $C_s$ and the write counter $C_w$ operate on different frequencies. Accordingly, the edge synchronization of SCLK and WCLK cannot be easily achieved. The WCLK, however, which drives the write counter $C_w$, has a fixed frequency relationship with SCLK determined by the frequency ratio $(F_s/F_w)=(N_w/N_s)$. Since normally $M_s=N_s$, if $M_w=N_w$, the two counters will wrap around at the same frequency.

Thus, an approximate synchronization between the spiral counter $C_s$ and the write counter $C_w$ can be easily achieved since both counters wrap around at the same rate. For example, since both counters wrap around at the same rate, an ideal value of $C_w$ at a given value of $C_s$ can be approximated using the following equation:

$$C_w = \text{round}\left[\left(\frac{N_w}{N_s}\right)*C_s\right]$$

A desired position on the disk where clock edges of SCLK and WCLK align together can be determined. The position is repeatable at every n cycles. Thus, the position is repeatable at every servo concentric wedge. Theoretically, the position can be anywhere on the disk. It may be desirable, however, to have this position at a starting point for writing a servo wedge. A desired position may be expressed by the following equation:

$$C_w = (n*M_w + D_w) = \text{round}\left(\frac{N_w}{N_s}*C_s\right) = \text{round}\left(\frac{N_w}{N_s}(n*M_s + D_s)\right)$$

Practically, a control signal may be generated when $C_s$ reaches a predetermined value that corresponds to the starting point for writing a servo wedge. The control signal can force the value of $C_w$ to a value that corresponds to the predetermined value of $C_s$. The value of $C_w$ that corresponds to the predetermined value of $C_s$ can be calculated using the above equation. Thus, a relationship between a WCLK edge and write counter value $C_w$ is determined, and an approximate synchronization between $C_s$ and $C_w$ is achieved. Subsequently, the phase difference between clock edges of SCLK and WCLK can be measured as follows.

Figure 8:
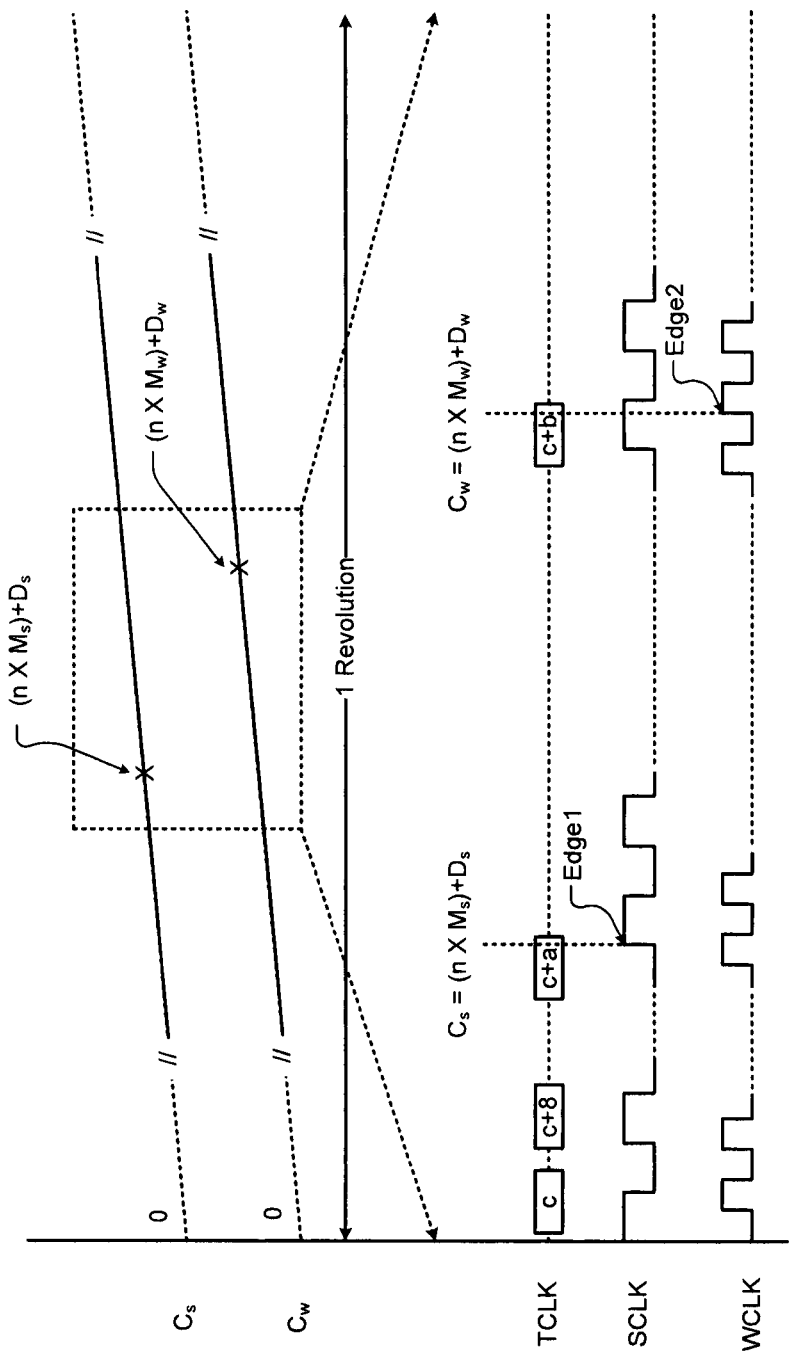
FIG. 8 is a timing diagram showing phase difference measurement and phase synchronization of SCLK and WCLK.

Referring now to FIG. 8, a time stamp counter T (not shown) may be operated using a reference clock TCLK. The time stamp counter T and the reference clock TCLK can be implemented by either physical clock/counter or virtual clock/counter. Preferably, a frequency of the reference clock TCLK may be much higher than the frequency $F_w$ of WCLK. For example, the frequency of TCLK may be 8 times the frequency $F_w$ of WCLK. The higher the frequency of TCLK, the more accurate the measurement of the phase difference between SCLK and WCLK.

A position of the read/write head on the disk for writing servo may be selected by selecting a predetermined value of $C_s$. A value of $C_w$ that corresponds to the predetermined value of $C_s$ can be calculated based on the frequency ratio of SCLK and WCLK (e.g., using the above equation).

In FIG. 8, Edge1 of SCLK is an edge of SCLK that generates the predetermined value of $C_s$, and Edge2 is an edge of WCLK that generates the corresponding value of $C_w$. $C_s=(n*M_s+D_s)$ when Edge1 of SCLK occurs (e.g., rises). $C_w=(n*M_w+D_w)$ when Edge2 of WCLK occurs (e.g., rises). Accordingly, a phase difference between SCLK and WCLK can be measured based on $C_s$ and $C_w$, and the phase difference can be used to adjust the phase of WCLK, for example, to phase lock WCLK to SCLK. The phase difference can be measured and adjusted as follows.

When $C_s=(n*M_s+D_s)$, a time stamp circuit may stamp a value of a count (C+a) of the time stamp counter T into a register $S_s$. (C+a) is the number of clock cycles of the reference clock TCLK counted by the time stamp counter T when the Edge1 of SCLK occurs. That is, (C+a) is the count of the time stamp counter T when the count of $C_s$ counter is $(n*M_s+D_s)$.

When $C_w=(n*M_w+D_w)$, the time stamp circuit may stamp a value of count (C+b) of the time stamp counter T into a register Sw. (C+b) is the number of clock cycles of the reference clock TCLK counted by the time stamp counter T when the Edge2 of WCLK occurs. That is, (C+b) is the count of the time stamp counter T when the count of $C_w$ counter is $(n*M_w+D_w)$.

In other words, the rising edge of SCLK (e.g., Edge1) can be time stamped with the value of the time stamp counter T when $C_s=(n*M_s+D_s)$. The rising edge of WCLK (e.g., Edge2) can be time stamped with the value of the time stamp counter T when $C_w=(n*M_w+D_w)$. The difference between the two time stamp values is the phase difference between the two clock edges Edge1 and Edge2 that are to be aligned.

The phase difference between SCLK and WCLK is a difference between Sw and Ss, which is equal to (b−a). For example, if (b−a) is 10, and the reference clock TCLK is 16 times faster than WCLK, then the phase offset between WCLK and SCLK is (10/16) of a cycle. As another example, if (b−a) is 48 and the reference clock TCLK is 16 times faster than WCLK, then the phase offset between WCLK and SCLK is 3 cycles. Thus, an amount of phase offset that should be corrected can be measured. The phase difference can be measured with greater accuracy when the reference clock TCLK is faster than WCLK.

If the difference (b−a) (i.e., the phase offset) is more than one WCLK cycle, (b−a) is added or subtracted form the $C_w$ counter. When the phase offset is a fraction of a cycle, the clock edges of SCLK and WCLK can then be aligned by adding or subtracting a clock phase from a phase of an interpolator module. For example, when a 64-phase interpolator is used, the phase of WCLK can be shifted (i.e., adjusted) by 64 different amounts depending on the value of (b−a).

Thus, Edge1 and Edge2 are aligned. In other words, the $C_w$ counter is synchronized to the $C_s$ counter. Accordingly, the desired position for writing servo (writing bit boundary) may be indicated by Edge1 (i.e., by count $C_s$). Servo can then be written at the desired position using WCLK at Edge2 based on the $C_w$ count that corresponds to the count $C_s$ and that is adjusted based on the difference (b−a).

Since alignment points now exist at every sector, the phase error for each sector should be negligible. Thus, when WCLK is generated from SCLK, and when SCLK is properly locked to the disk, the error in frequency offset between SCLK and WCLK should be negligible. The errors, however, accumulate. A firmware-based loop can be used to provide second order frequency offset tracking. Frequency offset errors can be corrected by periodically adding or subtracting the phase difference via a WPHASE input to the interpolation module 118.

When SCLK is phase locked to the disk rotation and WCLK is locked to SCLK, WCLK is also phase locked to the disk rotation. Thus, concentric servo write process can begin based on the value of write counter $C_w$ that corresponds to the desired writing position. Frequency $F_w$ of WCLK may be varied when writing servo in different zones while maintaining the WCLK phase locked to SCLK using the above process.

The selection of edge synchronization point is not critical for write stitching since all tracks in the same zone would have the same offset. However, if a starting position between two zones is important, the edge synchronization point may be set as close to a first transition of the write clock waveform as possible. Servo wedge format and write pattern generation processes used within an individual zone may be similar to those used when writing continuous radial concentric servo wedges.

Figure 9:
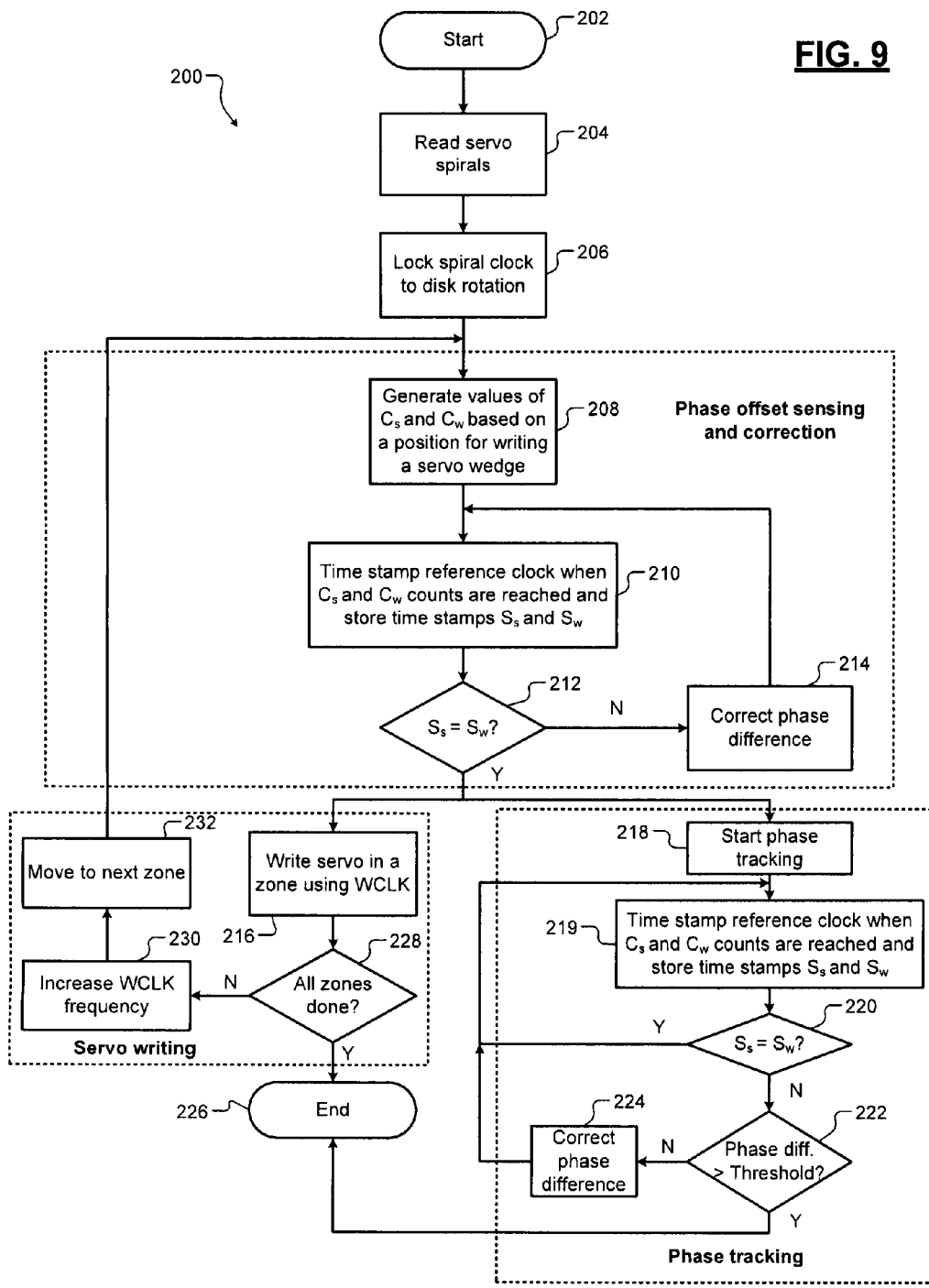
FIG. 9 is a flowchart of a method for writing servo wedges in zones using self-servo-writing.

Referring now to FIG. 9, a method 200 for writing servo wedges in zones using self-servo-writing according to the present disclosure is shown. Control begins in step 202. Control reads servo spirals in step 204. Control locks spiral clock to disk rotation in step 206.

Control begins phase offset sensing and correction in step 208. Specifically, in step 208, control generates a value of $C_s$ and a corresponding value of $C_w$ based on a desired position where a servo wedge is to be written. In step 210, control time stamps the reference clock when the spiral counter counts $C_s$ cycles of SCLK and when the write counter counts $C_w$ cycles of WCLK and stores the time stamps in registers $S_s$ and $S_w$, respectively. Control determines if $S_s=S_w$ in step 212. When $S_s$ and $S_w$ are unequal, control corrects the phase difference between SCLK and WCLK in step 214, and control returns to step 210.

When $S_s$ and $S_w$ are equal, control determines that SCLK and WCLK are synchronized (i.e., phase locked), and control begins servo writing in step 216 and phase tracking in step 218 at the same time. Specifically, control begins writing a servo wedge at the desired position in a first zone in step 216. At the same time, control begins to track the phase difference between SCLK and WCLK in step 218. In step 219, control time stamps the reference clock when the spiral counter counts $C_s$ cycles of SCLK and when the write counter counts $C_w$ cycles of WCLK and stores the time stamps in registers $S_s$ and $S_w$, respectively.

Control determines in step 220 if $S_s=S_w$. When $S_s=S_w$, control determines that SCLK and WCLK continue to be phase locked, and control returns to step 219. Additionally, control continues servo writing in step 216 and beyond.

In step 220, when $S_s$ and $S_w$ are unequal, control determines in step 222 whether the phase difference between SCLK and WCLK is greater than a predetermined threshold. When the phase difference is less than or equal to the predetermined threshold, control corrects the phase difference in step 224, and control returns to step 219. Additionally, control continues servo writing in step 216. When the phase difference is greater than the predetermined threshold, control ends in step 226.

At the end of step 216, control determines in step 228 whether servo is written in all zones. When servo is not written in all zones, control changes WCLK frequency $F_w$ in step 230, moves the read/write head to the next zone in step 232, and returns to step 208. When control determines in step 228 that servo is written in all zones, control ends in step 226.

Throughout the present disclosure, zone servo writing from ID to OD is used as an example only. Alternatively, zone servo may be written using the systems and methods described herein from OD to ID. The WCLK frequency $F_w$ is increased when writing zone servo from ID to OD or decreased when writing zone servo from OD to ID.

Figure 10:
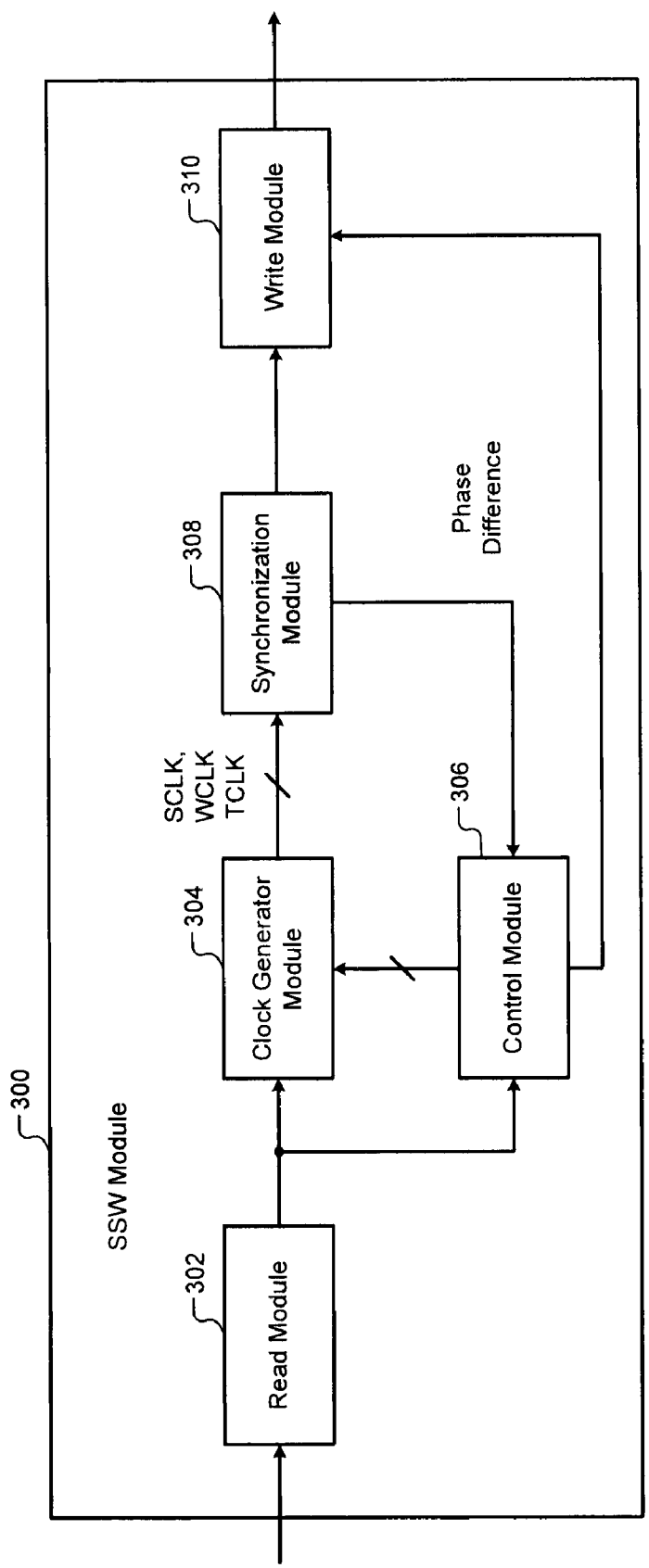
FIG. 10 is a functional block diagram of a self-servo-write (SSW) module.

Referring now to FIG. 10, a self-servo-write (SSW) module 300 for writing zone servo according to the present disclosure is shown. The SSW module 300 may comprise a read module 302, a clock generator module 304, a control module 306, a synchronization module 308, and a write module 310.

The read module 302 reads servo spirals prewritten on the HDD using a read head of the HDD. The read module 302 generates read signals based on the servo spirals read by the read head. The clock generator module 304 generates the spiral clock SCLK from the read signals. The clock generator module 304 generates the write clock WCLK from SCLK. Additionally, the clock generator module 304 generates the reference clock TCLK.

The control module 306 receives the read signals. The control module 306 determines when a write head of the HDD is to be moved from one track to another in a zone. Additionally, the control module 306 determines when the write head is to be moved from one zone to another. The control module 306 outputs a control signal to the clock generator module 304 when the write head is moved from one zone to another. The clock generator module 304 increases the frequency $F_w$ of WCLK when the write head is moved from a zone closer to the ID to a zone closer to the OD. Conversely, the clock generator module 304 may decrease the frequency $F_w$ of WCLK when the write head is moved from a zone closer to the OD to a zone closer to the ID.

The synchronization module 308 synchronizes SCLK to disk rotation. Additionally, the synchronization module 308 synchronizes the phases of SCLK and WCLK using TCLK. The synchronization module 308 outputs a synchronization signal to the control module 306 when the phases of SCLK and WCLK are synchronized. When the phases of SCLK and WCLK are synchronized, the control module 306 outputs a write signal to the write module 310. The write module 310 writes servo wedges in zones using WCLK that is synchronized and phase locked to SCLK.

Figure 11:
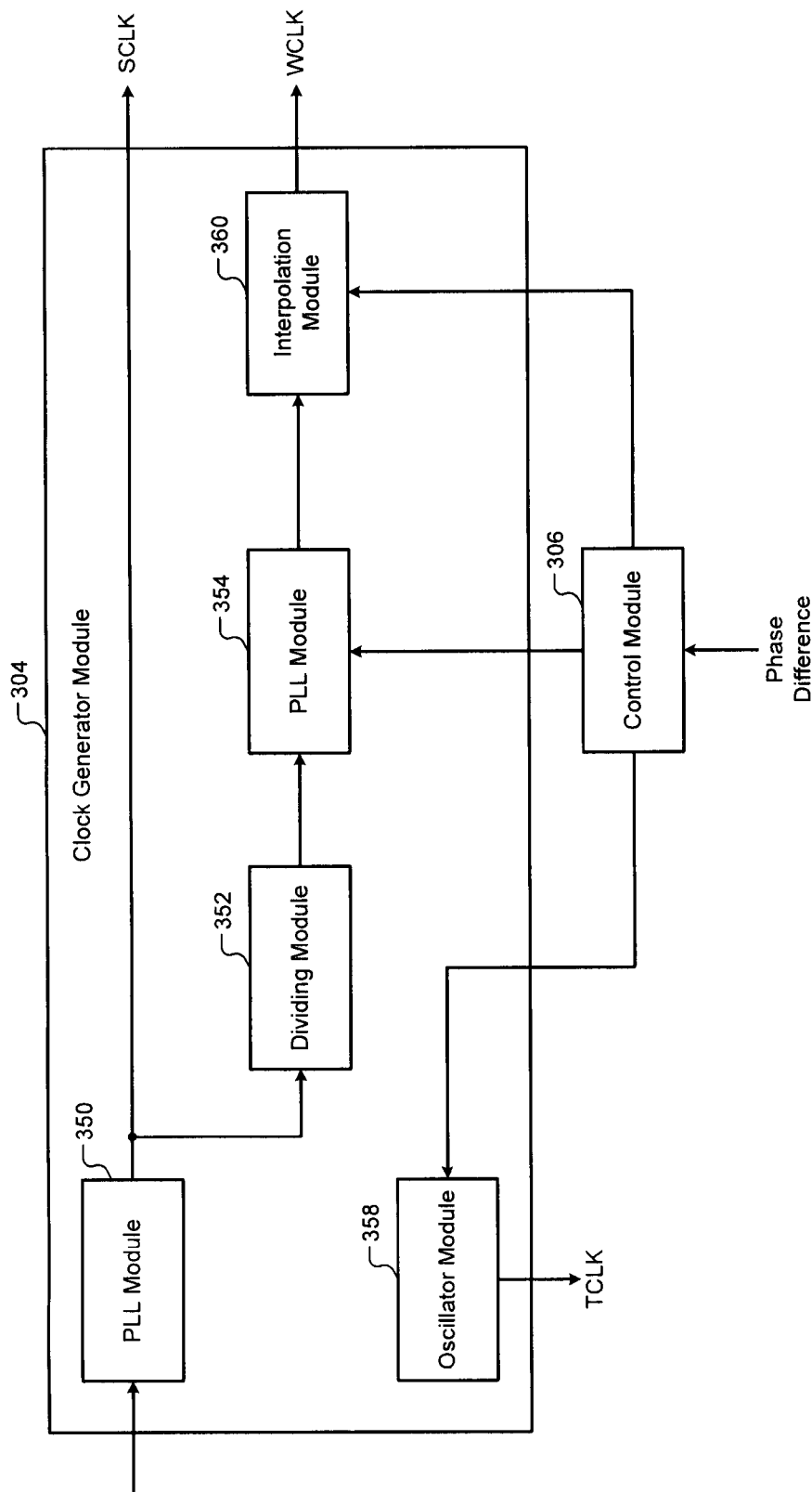
FIG. 11 is a functional block diagram of a clock generator module of the SSW module of FIG. 10.

Referring now to FIG. 11, the clock generator module 304 may comprise a phase-locked loop (PLL) module 350, a dividing module 352, a PLL module 354, an oscillator module 358, and an interpolation module 360. The PLL module 350 generates SCLK based on the read signals. The dividing module 352 divides SCLK by a divisor d and generates a divided clock signal. The divisor d is an integer greater than 1.

The PLL module 354 generates WCLK based on the divided clock signal. Specifically, the PLL module 254 multiplies the divided clock signal by a multiplier m. The multiplier m is a binary number generated by the control module 306. A decimal equivalent of the multiplier is an integer greater than 1. The control module 306 increments m when the write head is moved from one zone to another.

The oscillator module 358 generates the reference clock TCLK. The control module 306 may control the frequency of TCLK such that the frequency of TCLK is an integer multiple of the frequency $F_w$ of WCLK and is much greater than the frequency $F_w$ of WCLK. For example only, the control module 306 may maintain a ratio of frequencies of TCLK to WCLK equal to 8, 16, or another integer greater than 1. Thus, the control module 306 may increase the frequency of TCLK proportionally to the frequency $F_w$ of WCLK when the write head is moved from an inner zone to an outer zone.

The synchronization module 308 measures the phase difference between SCLK and WCLK and outputs the phase difference to control module 306. The control module 306 adjusts the phase of the interpolation module 360 by an amount based on the phase difference. For example only, the interpolation module 360 may comprise a 64-phase clock interpolator (not shown). The control module 306 may select the phase of WCLK from one of 64 different values depending on the phase difference measured by the synchronization module 308.

Figure 12:
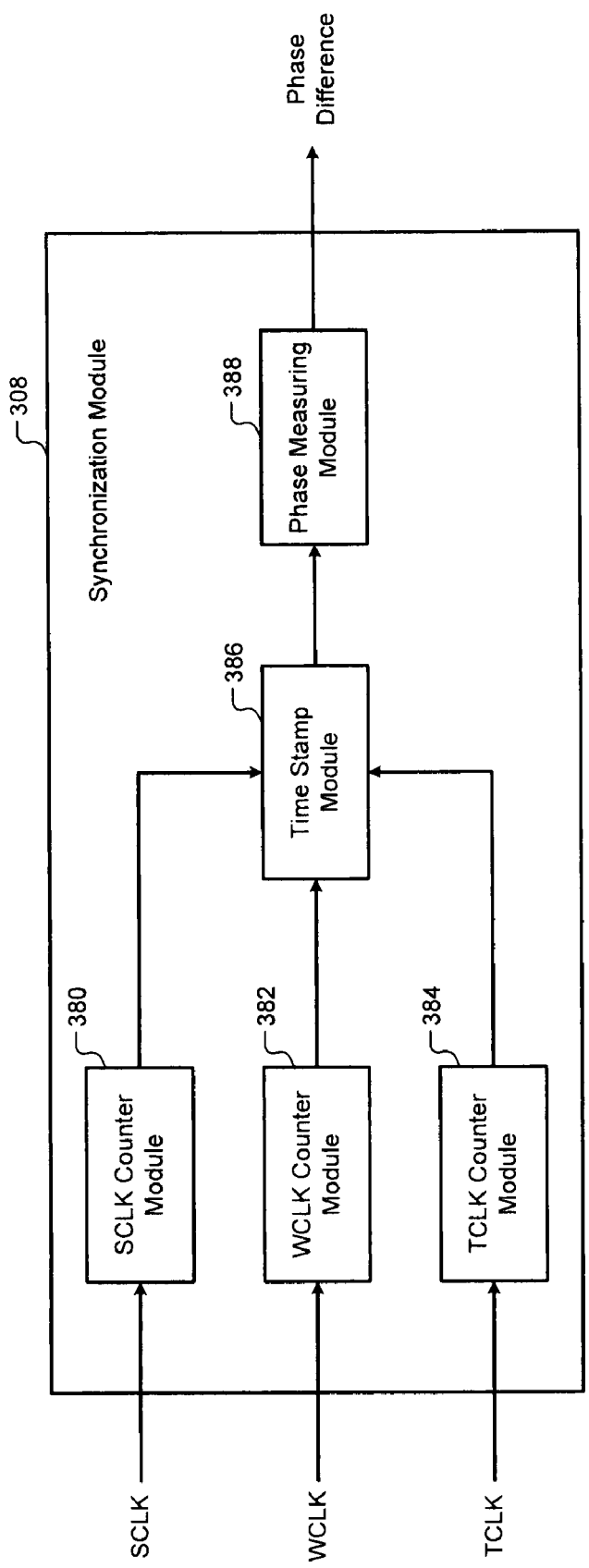
FIG. 12 is a functional block diagram of a synchronization module of the SSW module of FIG. 10.

Referring now to FIG. 12, the synchronization module 308 may comprise a SCLK counter module 380, a WCLK counter module 382, a TCLK counter module 384, a time stamp module 386, and a phase measuring module 388. The SCLK counter module 380 counts SCLK clock cycles. The WCLK counter module 382 counts WCLK clock cycles. The TCLK counter module 384 counts TCLK clock cycles.

The time stamp module 386 time stamps a first TCLK clock cycle count when SCLK clock cycles counted by the SCLK counter module 380 equals a predetermined count $C_s$ based on a desired position where a servo wedge is to be written. The time stamp module 386 time stamps a second TCLK clock cycle count when WCLK clock cycle count $C_w$ counted by the WCLK counter module 382 equals a number corresponding to the predetermined count $C_s$. The time stamp module 386 stores the first and second TCLK clock cycle counts.

The phase measuring module 388 measures the phase difference between SCLK and WCLK based on a difference between the first and second TCLK clock cycle counts and the frequency of TCLK. For example, the phase difference is equal to the difference between the first and second TCLK clock cycle counts divided by the frequency of TCLK. The phase measuring module 388 outputs the measured phase difference to the control module 306.

The control module 306 adjusts the phase of WCLK in the interpolation module 360 by an amount based on the phase difference. The interpolation module 360 aligns (i.e., synchronizes) the phase of SCLK and WCLK based on the phase difference. When the phases of SCLK and WCLK are aligned (i.e., synchronized), the spiral counter $C_s$ and the write counter $C_w$ are aligned (i.e., synchronized). The control module 306 detects when the phases of SCLK and WCLK are aligned (i.e., synchronized). For example, the control module 306 may determine that the phases of SCLK and WCLK are aligned when the phase difference is zero or nearly zero (negligible). Subsequently, the control module 306 outputs the write signal to the write module 310, which begins writing servo wedges in zones using WCLK. The positions to begin writing the servo wedges are determined by the write counter $C_w$ that is now synchronized to the spiral counter $C_s$ and to the disk rotation.

Figure 13:
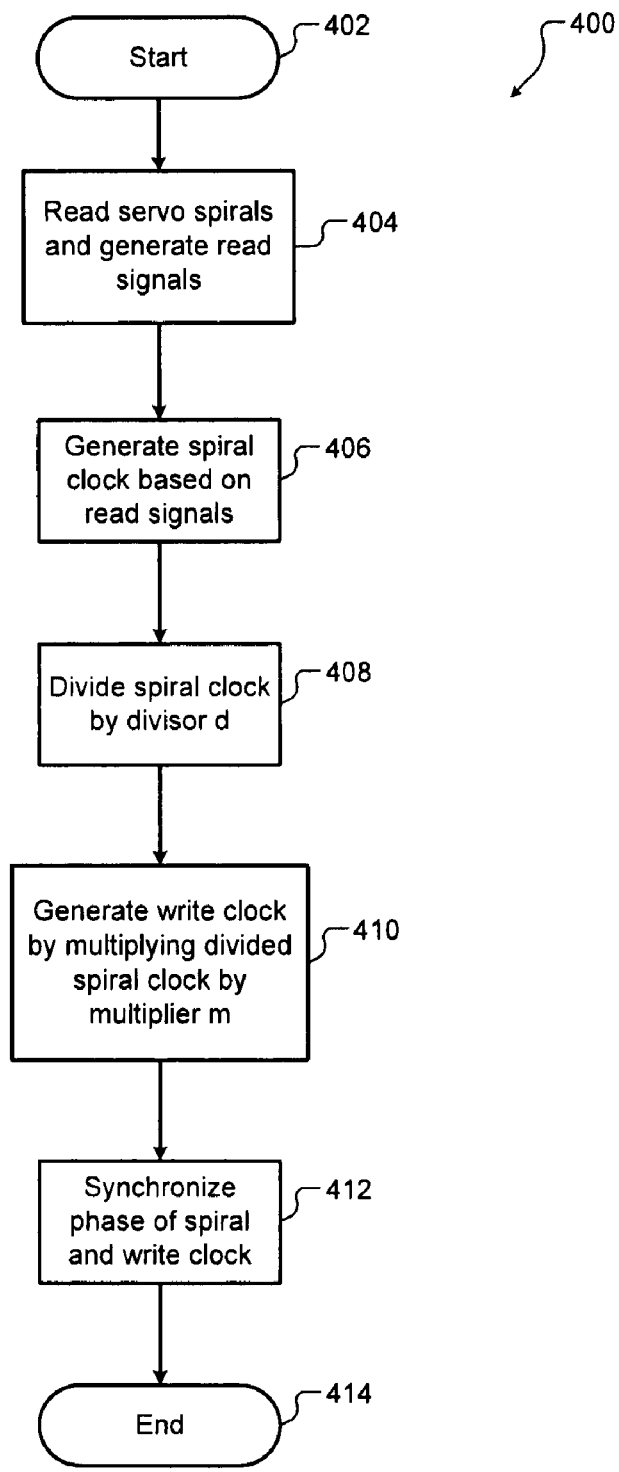
FIG. 13 is a flowchart of a method for generating WCLK based on SCLK for writing zone servo using SSW.

Referring now to FIG. 13, a method 400 for generating write clock for writing zone servo using SSW is shown. Control begins in step 402. Control reads prewritten servo spirals and generates read signals in step 404. Control generates the spiral clock SCLK based on the read signals in step 406.

Control divides SCLK by an integer divisor d and generates a divided clock signal in step 408. Control multiplies the divided clock signal by a multiplier m and generates the write clock WCLK in step 410. The multiplier m may be a binary number and may represent an integer. Control synchronizes the phase of WCLK and SCLK in step 412. Control ends in step 414.

In FIGS. 11 and 13, WCLK is derived from SCLK for example only. Deriving WCLK from SCLK, however, is optional. Instead, although not shown, WCLK may be generated using the apparatus shown in FIG. 5A.

Figure 14:
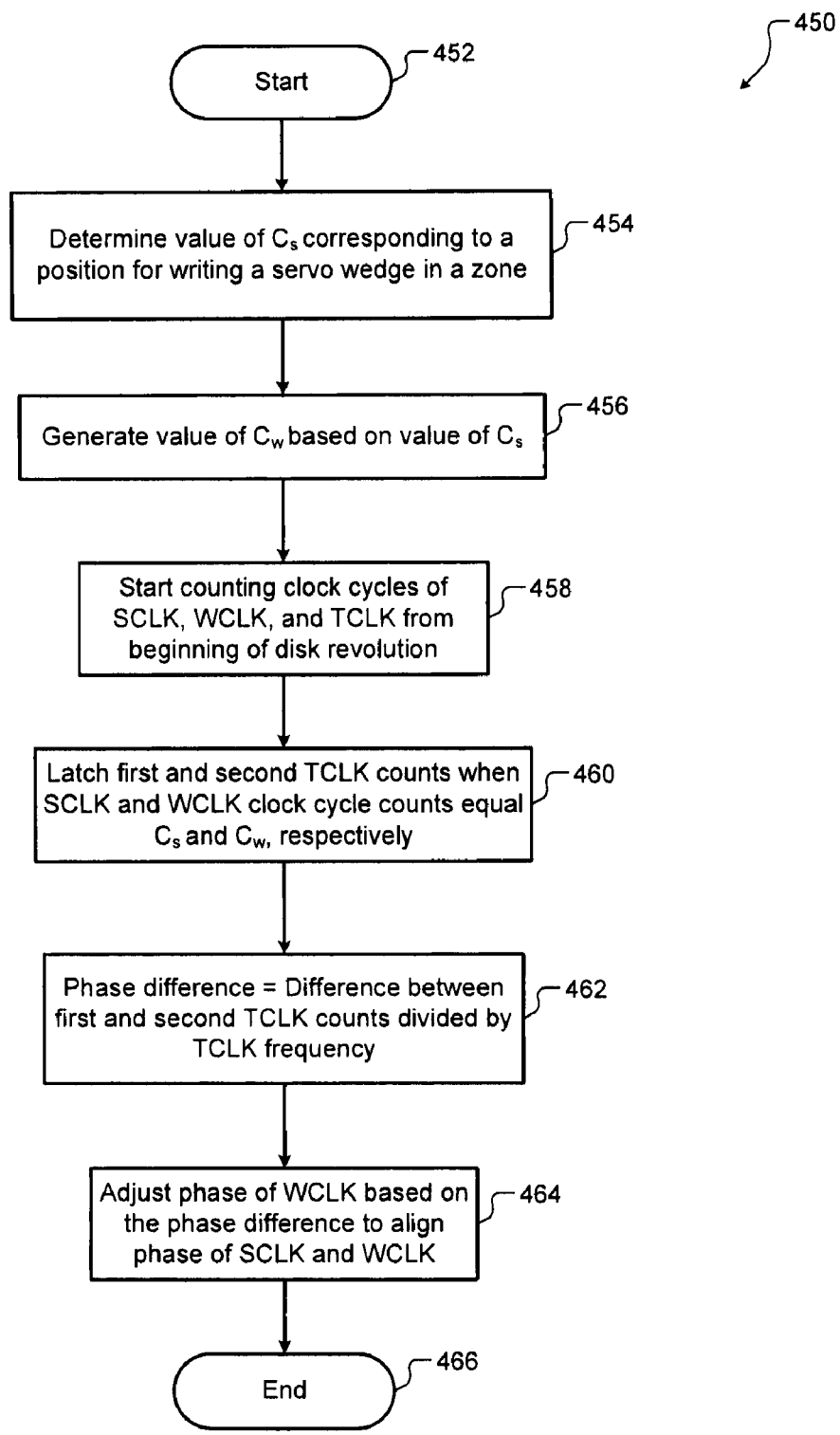
FIG. 14 is a flowchart of a method for synchronizing the phase of SCLK and WCLK.

Referring now to FIG. 14, a method 450 for synchronizing the phase of SCLK and WCLK is shown. Control begins in step 452. In step 454, control determines a value of the spiral counter $C_s$ based on a desired position where a spiral wedge is to be written. Control generates a value of the write counter $C_w$ that corresponds to the value of $C_s$ in step 456.

In step 458, control begins counting clock cycles of the spiral clock SCLK, the write clock WCLK, and the reference clock TCLK from a predetermined reference time. For example, the predetermined reference time may include a time when a disk revolution begins. Control may use counters to count the clock cycles.

In step 460, control latches a first TCLK count when SCLK count equals $C_s$ and a second TCLK count when WCLK count equals $C_w$. In step 462, control determines the phase difference between SCLK and WCLK by dividing a difference between the first and second TCLK counts by the frequency of the reference clock TCLK. In step 464, control adjusts the phase of WCLK based on the phase difference to align the phase of SCLK and WCLK. When the phase of SCLK and WCLK is aligned, the spiral counter $C_s$ and the write counter $C_w$ are synchronized to the disk rotation, and control ends in step 466.

Figure 15:
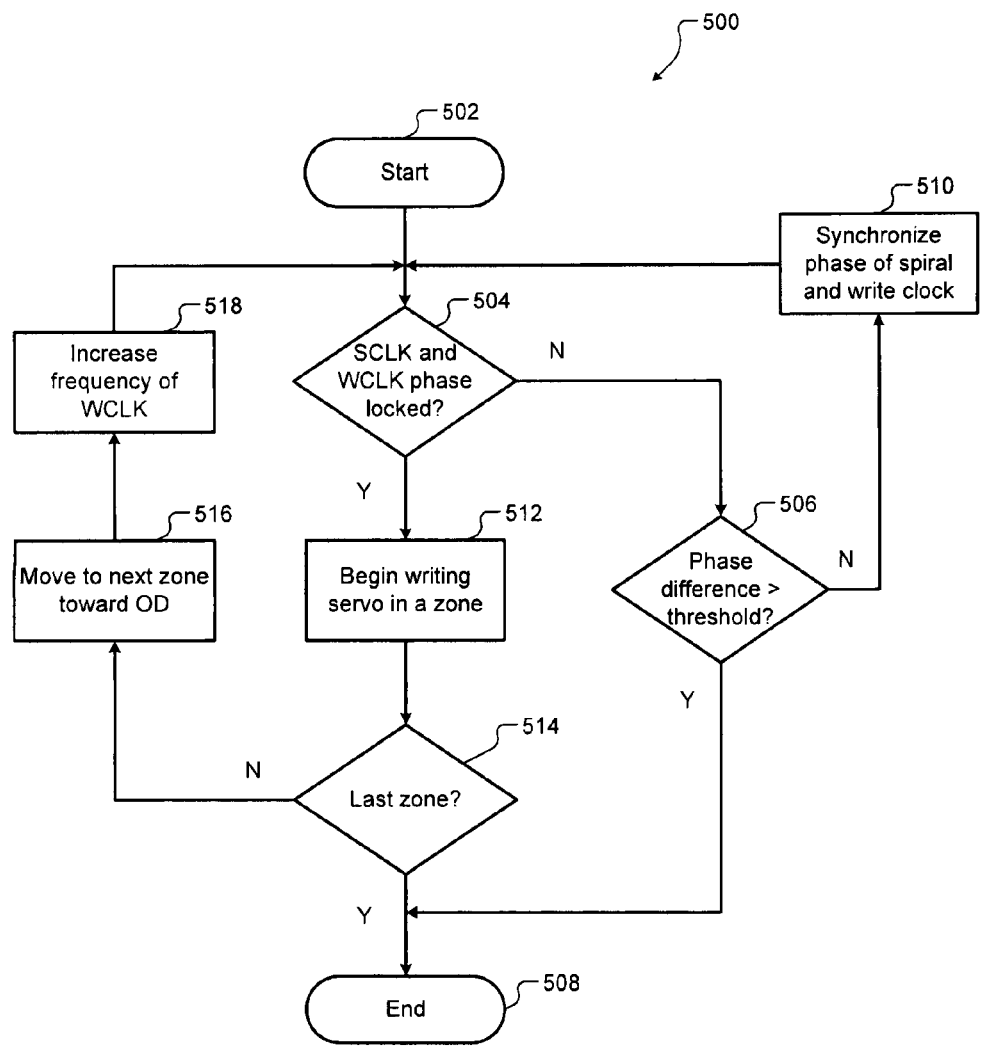
FIG. 15 is a flowchart of a method for writing servo wedges in zones using SSW.

Referring now to FIG. 15, a method 500 for writing servo wedges in zones using SSW according to the present disclosure is shown. Control begins in step 502. Control determines in step 504 whether SCLK and WCLK are phase locked (i.e., synchronized). When SCLK and WCLK are not synchronized, control determines in step 506 if the phase difference between SCLK and WCLK is greater than a predetermined threshold. If the phase difference is greater than the predetermined threshold, control ends in step 508. If the phase difference is less than or equal to the predetermined threshold, control synchronizes phase of SCLK and WCLK in step 510, and control returns to step 504.

When SCLK and WCLK are synchronized (i.e., phase locked), control begins writing servo wedges in a zone using WCLK in step 512. Control uses write counter $C_w$ that is synchronized to the spiral counter to determine positions to begin writing the servo wedges. Control determines if the current zone is the last zone in step 514. If the current zone is the last zone, control ends in step 508. If the current zone is not the last zone, control moves the write head to the next zone away from the ID in step 516, increases the frequency $F_w$ of WCLK in step 518, and returns to step 504.

The disclosure generally assumes that servo is written in zones from ID to OD. In some implementations, however, servo may be written from OD to ID. When servo is written from OD to ID, the frequency $F_w$ of WCLK may be decreased as the write head is moved from a zone closer to the OD to a zone closer to the ID.

In some implementations, the SSW module 300 may be integrated with a hard disk controller (HDC) of the disk drive. One or more modules of the SSW module 300 may perform one or more functions and operations described herein with reference to FIGS. 2-9 and FIGS. 11-15.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A hard disk controller (HDC) of a hard disk drive (HDD), comprising:
a read module that reads servo spirals from a magnetic medium of the HDD via a read head of the HDD and that generates read signals;
a clock generator module that generates a spiral clock having a first frequency based on the read signals and that generates based on the spiral clock R write clocks having R frequencies, respectively, that are different than the first frequency, where R is an integer greater than 1; and
a write module that writes a first servo wedge via a write head of the HDD on a first one of R zones of the magnetic medium using a first one of the R write clocks and that writes a second servo wedge via the write head on a second one of the R zones using a second one of the R write clocks.

2. The HDC of claim 1, wherein the write module writes the first and second servo wedges when respective phases of the first and second ones of the R write clocks are synchronized to a respective phase of the spiral clock.

3. The HDC of claim 1, wherein the first one of the R zones includes portions of a first set of tracks of the magnetic medium, the second one of the R zones includes portions of a second set of tracks of the magnetic medium, radii of tracks in the first set are different than radii of tracks in the second set, and the first and second ones of the R zones are aligned along a radius of the magnetic medium.

4. The HDC of claim 1, wherein the clock generator module comprises:
a dividing module that divides the first frequency by D and that generates a divided signal having a second frequency, where D is an integer greater than 1; and
a phase locked loop (PLL) that generates one of the R write clocks based on the divided signal by multiplying the second frequency by M, where M is an integer greater than 1,
wherein the R frequencies are generated using different values of M.

5. The HDC of claim 1 further comprising a phase measuring module that measures a phase difference between the spiral clock and one of the R write clocks based on a reference clock having a third frequency that is greater than a corresponding frequency of the one of the R write clocks.

6. The HDC of claim 5 further comprising:
a counting module that counts pulses of the reference clock from a reference time and that generates first and second counts when a first predetermined number of pulses of the spiral clock and a second predetermined number of pulses of the one of the R write clocks are counted from the reference time, respectively, wherein the phase measuring module measures the phase difference based on the third frequency and a difference between the first and second counts.

7. The HDC of claim 5 further comprising a control module that adjusts a first phase of the one of the R write clocks based on the phase difference and that synchronizes the first phase to a second phase of the spiral clock.

8. A hard disk controller (HDC) of a hard disk drive (HDD), comprising:
- a read module that reads servo spirals from a magnetic medium of the HDD via a read head of the HDD and that generates read signals;
- a clock generator module that generates a spiral clock having a first frequency based on the read signals and that generates based on the spiral clock a write clock having a second frequency that is different than the first frequency; and
- a phase measuring module that measures a phase difference between the spiral clock and the write clock based on a reference clock having a third frequency that is greater than the second frequency.

9. The HDC of claim 8 further comprising a write module that writes a first servo wedge via a write head of the HDD on a first zone of the magnetic medium using the write clock when the phase difference is corrected, wherein the first zone is proximate to an inner diameter (ID) of the magnetic medium.

10. The HDC of claim 9, wherein:
- the clock generator module generates the write clock having a fourth frequency that is different than the first and second frequencies and that is less than the third frequency; and
- the write module writes a second servo wedge via the write head on a second zone of the magnetic medium using the write clock having the fourth frequency, where the second zone is proximate to an outer diameter (OD) of the magnetic medium and is aligned with the first zone along a radius of the magnetic medium.

11. The HDC of claim 8 further comprising:
- a counting module that counts pulses of the reference clock from a reference time and that generates first and second counts when a first predetermined number of pulses of the spiral clock and a second predetermined number of pulses of the write clock are counted from the reference time, respectively,
- wherein the phase measuring module measures the phase difference based on the third frequency and a difference between the first and second counts.

12. The HDC of claim 8 further comprising a control module that adjusts a first phase of the write clock based on the phase difference and that synchronizes the first phase to a second phase of the spiral clock.

13. The HDC of claim 8, wherein the clock generator module comprises:
- a dividing module that divides the first frequency by D and that generates a divided signal having a fourth frequency, where D is an integer greater than 1; and
- a phase locked loop (PLL) that generates the write clock based on the divided signal by multiplying the fourth frequency by M, where M is an integer greater than 1.

14. The HDC of claim 13, wherein the PLL increases the second frequency by increasing M when a write head of the HDD moves from a first zone to a second zone to write a servo wedge, and wherein the first zone is proximate to an inner diameter (ID) of the magnetic medium, and wherein the second zone is proximate to an outer diameter (OD) of the magnetic medium.

15. The HDC of claim 13, wherein the PLL decreases the second frequency by decreasing M when a write head of the HDD moves from a first zone to a second zone to write a servo wedge, and wherein the first zone is proximate to an outer diameter (OD) of the magnetic medium, and wherein the second zone is proximate to an inner diameter (ID) of the magnetic medium.

* * * * *